United States Patent
Tran et al.

(10) Patent No.: US 12,088,395 B2
(45) Date of Patent: Sep. 10, 2024

(54) BEAM FAILURE RECOVERY FOR SINGLE DCI-BASED M-TRP URLLC TRANSMISSIONS

(71) Applicant: Panasonic Intellectual Property Corporation of America, Torrance, CA (US)

(72) Inventors: Xuan Tuong Tran, Singapore (SG); Hidetoshi Suzuki, Kanagawa (JP); Lei Huang, Singapore (SG); Tien-Ming Benjamin Koh, Singapore (SG); Yang Kang, Singapore (SG); Akihiko Nishio, Osaka (JP); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 114 days.

(21) Appl. No.: 17/796,608

(22) PCT Filed: Dec. 3, 2020

(86) PCT No.: PCT/SG2020/050714
§ 371 (c)(1),
(2) Date: Jul. 29, 2022

(87) PCT Pub. No.: WO2021/167528
PCT Pub. Date: Aug. 26, 2021

(65) Prior Publication Data
US 2023/0053871 A1    Feb. 23, 2023

(30) Foreign Application Priority Data
Feb. 22, 2020 (SG) .............. 10202001583T

(51) Int. Cl.
H04B 7/08 (2006.01)
H04B 7/0408 (2017.01)
(Continued)

(52) U.S. Cl.
CPC .......... H04B 7/088 (2013.01); H04B 7/0408 (2013.01); H04B 7/0695 (2013.01);
(Continued)

(58) Field of Classification Search
CPC .... H04B 7/088; H04B 7/0408; H04B 7/0695; H04B 7/022; H04B 7/06964;
(Continued)

(56) References Cited

U.S. PATENT DOCUMENTS

2019/0037498 A1    1/2019   Tseng et al.
2020/0053824 A1    2/2020   He
(Continued)

FOREIGN PATENT DOCUMENTS

WO    WO 2021013182 A1    1/2021

OTHER PUBLICATIONS

Machine translation of JP-2021524724-A. (Year: 2021).*
(Continued)

Primary Examiner — Jean B Corrielus
(74) Attorney, Agent, or Firm — Seed IP Law Group LLP

(57) ABSTRACT

Apparatuses and systems for providing multiple structures to enable flexibility of a multiple transmission and reception point ultra-reliable low-latency communication (M-TRP URLLC) operation and reduce measurement effort and power consumption from a transceiving apparatus such as a UE are provided. The techniques disclosed here feature a transceiving apparatus including a transceiver and circuitry. The transceiver, in operation, receives signals from multiple transmission and reception points (M-TRPs) in a network on at least physical downlink shared channels (PDSCHs). The
(Continued)

circuitry, in operation, performs beam failure recovery (BFR) by evaluating beam failure detection (BFD) and candidate new beam detection (CBD) for the signals from at least a first one of the M-TRPs. The signals from the first one of the M-TRPs comprise signals received on a physical downlink control channel (PDCCH), and the circuitry determines to skip evaluation of one or both of the BFD and the CBD for one or more additional ones of the M-TRPs in response to one or more conditions.

14 Claims, 9 Drawing Sheets

(51) Int. Cl.
    *H04B 7/06*     (2006.01)
    *H04W 72/21*     (2023.01)
    *H04W 72/23*     (2023.01)
    *H04W 76/18*     (2018.01)

(52) U.S. Cl.
    CPC .......... *H04W 72/21* (2023.01); *H04W 72/23* (2023.01); *H04W 76/18* (2018.02)

(58) Field of Classification Search
    CPC ..... H04W 72/21; H04W 72/23; H04W 76/18; H04W 24/08; Y02D 30/70
    See application file for complete search history.

(56) References Cited

U.S. PATENT DOCUMENTS

2021/0226684 A1*  7/2021  Koskela ................ H04L 5/0048
2021/0399863 A1* 12/2021  Yu ........................ H04L 5/0058
2022/0286183 A1*  9/2022  Yi ......................... H04L 5/0053

OTHER PUBLICATIONS

Machine translation of CN-110896546-B. (Year: 2020).*
Machine translation of CN-112118037-B (Year: 2020).*
Extended European Search Report dated Jun. 19, 2023, for the corresponding European Patent Application No. 20919951.2, 14 pages.
"Discussion of Beam Failure Recovery for SCell," R1-1910857, Agenda item: 7.2.8.3, 3GPP TSG RAN WG1 #98bis, Chongqing, China, Oct. 14-20, 2019. (3 pages).
3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018. (39 pages).
3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).
3GPP, "3rd Generation Partnership Project; Technical Specification Group Radio Access Network; NR; Physical channels and modulation (Release 15)," 3GPP TS 38.211 V15.6.0, Jun. 2019. (97 pages).
3GPP, "3rd Generation Partnership Project; Technical Specification Group Radio Access Network; NR; Requirements for support of radio resource management (Release 16)," 3GPP TS 38.133 V16.2.0, Dec. 2019 (1130 pages).
3GPP, "3rd Generation Partnership Project; Technical Specification Group Radio Access Network; NR; Physical layer procedures for control (Release 16)," 3GPP TS 38.213 V16.0.0, Dec. 2019 (146 pages).
Convida Wireless, "On Beam Failure Recovery for SCell," R1-1911006, Agenda item: 7.2.8.3, 3GPP TSG-RAN WG1 #98bis, Chongqing, China, Oct. 14-20, 2019. (7 pages).
Convida Wireless, "On Beam Failure Recovery for SCell," R1-1913140, Agenda item: 7.2.8.3, 3GPP TSG-RAN WG1 #99, Reno, USA, Nov. 18-22, 2019. (6 pages).
International Search Report, mailed Mar. 9, 2021, for International Patent Application No. PCT/SG2020/050714 (4 pages).

* cited by examiner

BEAM FAILURE RECOVERY FOR SINGLE DCI-BASED M-TRP URLLC TRANSMISSIONS

BACKGROUND

1. Technical Field

The present invention relates generally to communication apparatuses, and more particularly relates to beam failure recovery mechanisms for such communication apparatuses.

2. Description of the Related Art

Communication apparatuses are prevalent in today's world in the form of phones, tablets, computers, cameras, digital audio/video players, wearable devices, game consoles, telehealth/telemedicine devices, and vehicles providing communication functionality, and various combinations thereof. The communication may include exchanging data through, for example, a cellular system, a wireless local area network (LAN) system, a satellite system, and various combinations thereof.

As communications progress to higher generations (e.g., 5G new Radio (5G NR)), ultra-reliable and low-latency communications (URLLC) is required for many applications (e.g., Augmented Reality/Virtual Reality (AR/VR), e-health, e-safety, and mission-critical applications). URLLC has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. In addition, 5G NR includes multiple transmission and reception points (M-TRPs) in order to improve reliability, coverage, and capacity performance through flexible deployment scenarios. For example, to be able to support the exponential growth in mobile data traffic in 5G and to enhance the coverage, the user equipment (UE) (i.e., communication apparatus) is expected to access networks composed of M-TRPs (e.g., macro-cells, small cells, pico-cells, femto-cells, remote radio heads, relay nodes).

During operation, the UE can access signals from M-TRPs. The UE determines a signal from one of the M-TRPs is lost through a beam failure detection (BFD) procedure. The UE then attempts to recover communication-a process which includes new beam identification (NBI), also known as candidate new beam detection (CBD). While both BFD and CBD are critical UE processes in order to maintain ultra-reliability and low latency in URLLC communications, recovery after beam failure including BFD and CBD processes requires measurement effort and power consumption.

Thus, there is a need for communication apparatuses and systems which conserve power without losing reliability in URLLC communications during recovery after beam failure situations. Furthermore, other desirable features and characteristics will become apparent from the subsequent detailed description and the appended claims, taken in conjunction with the accompanying drawings and this background.

SUMMARY

One non-limiting and exemplary embodiment facilitates providing multiple structures to enable flexibility of a multiple transmission and reception point ultra-reliable low-latency communication (M-TRP URLLC) operation and reduce measurement effort and power consumption from a transceiving apparatus such as a UE.

In an embodiment, the techniques disclosed here feature a transceiving apparatus including a transceiver and circuitry. The transceiver, in operation, receives signals from multiple transmission and reception points (M-TRPs) in a network on at least physical downlink shared channels (PDSCHs). The circuitry, in operation, performs beam failure recovery (BFR) by evaluating beam failure detection (BFD) and candidate new beam detection (CBD) for the signals from at least a first one of the M-TRPs. The signals from the first one of the M-TRPs comprise signals received on a physical downlink control channel (PDCCH), and the circuitry determines to skip (or perform) one or both of the BFD and the CBD in response to one or more operational conditions.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE FIGURES

In the following, exemplary embodiments are described in more detail with reference to the attached figures and drawings.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the exemplary embodiments or the application and uses of the exemplary embodiments. Furthermore, there is no intention to be bound by any theory presented in the preceding background or the following detailed description. It is the intent of the present disclosure to present exemplary embodiments of communication apparatuses and communication systems which conserve power without losing reliability in ultra-reliable and low-latency communications (URLLC) communications during recovery after beam failure situations, thereby reducing measurement effort and power consumption during beam failure recover (BFR) while maintaining ultra-reliable and low-latency communications.

5G NR System Architecture and Protocol Stacks

The 3rd Generation Partnership Project (3GPP) has been working at the next release for the 5th generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
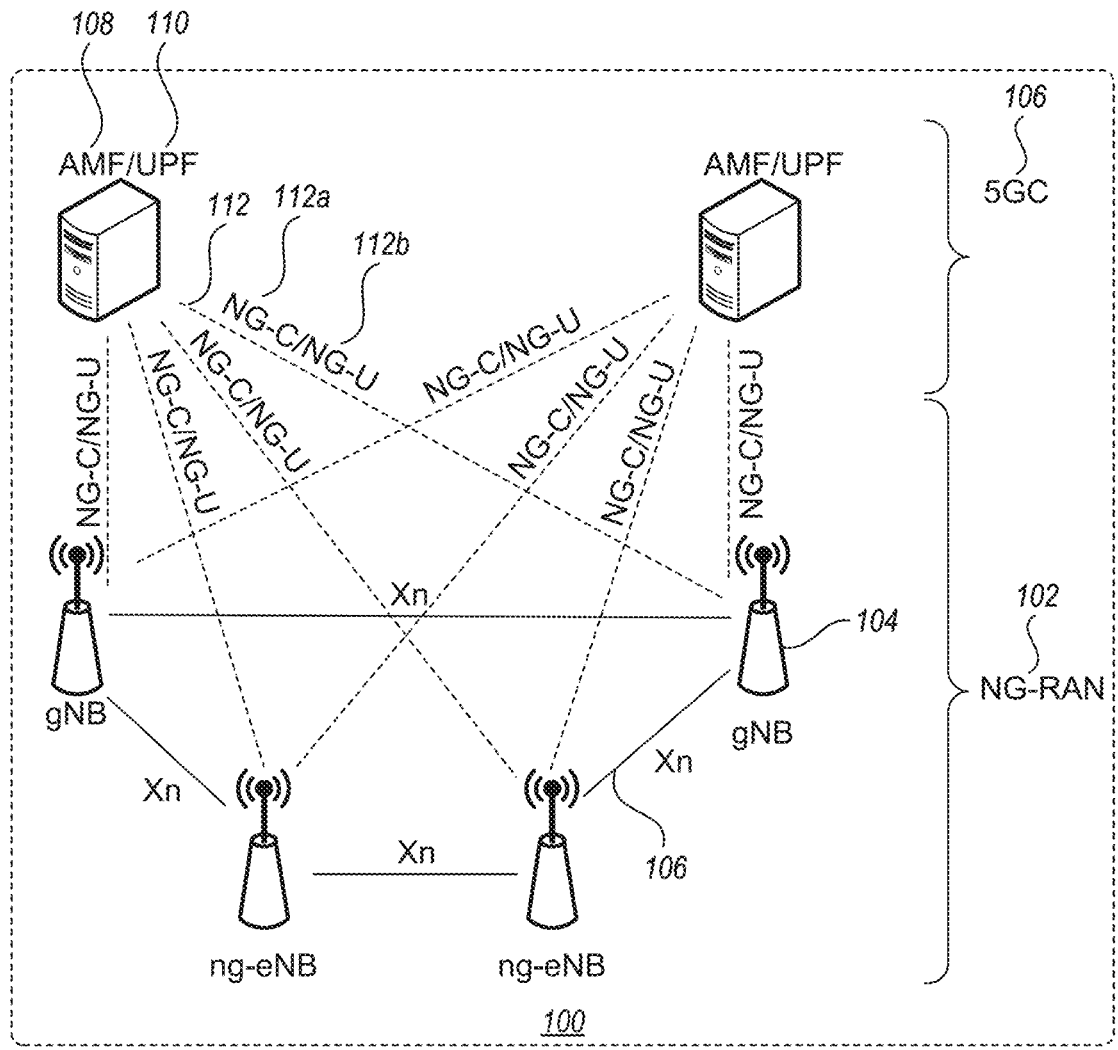
FIG. 1 shows an exemplary architecture for a 3GPP NR system.

Referring to FIG. 1, among other things, the overall system architecture assumes a Next Generation—Radio Access Network (NG-RAN) 102 that comprises gNBs 104, providing the NG-radio access user plane (SDAP/PDCP/RLC/MAC/PHY) and radio resource control (RRC) protocol terminations towards the UE. The gNBs 104 are interconnected with each other by means of the Xn interface 106. The gNBs are also connected by means of the Next Generation (NG) interface to the Next Generation Core (NGC) 108, more specifically to the Access and Mobility Management Function (AMF) 110 (e.g., a particular core entity performing the AMF) by means of the NG-C interface 112a and to the User Plane Function (UPF) 110 (e.g., a particular core entity performing the UPF) by means of the NG-U interface 112b. The NG-RAN architecture 100 is illustrated in FIG. 1 (see e.g., 3GPP TS 38.300 v15.6.0, section 4).

The user plane protocol stack for NR (see e.g. 3GPP TS 38.300, section 4.4.1) comprises the Packet Data Convergence Protocol (PDCP) (see section 6.4 of TS 38.300), Radio Link Control (RLC) (see section 6.3 of TS 38.300) and MAC (Medium Access Control, see section 6.2 of TS 38.300) sublayers, which are terminated in the gNB on the network side. Additionally, a new access stratum (AS) sublayer (Service Data Adaptation Protocol (SDAP)) is introduced above PDCP (see e.g. sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are Physical Random Access Channel (PRACH), Physical Uplink Shared Channel (PUSCH) and Physical Uplink Control Channel (PUCCH) for uplink and Physical Downlink Shared Channel (PDSCH), Physical Downlink Control Channel (PDCCH) and Physical Broadcast Channel (PBCH) for downlink.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1-10^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g. subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f = 1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC (Control Signals)

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sildelink control information (SCI) or the 2nd stage SCI.

(Base Station)

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well.

(Uplink/Downlink/Sidelink)

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

(Data Channels/Control Channels)

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

(Reference Signals)

In the present disclosure, the reference signals are signals known to both a base station and a mobile station and each reference signal may be referred to as a Reference Signal (RS) or sometimes a pilot signal. The reference signal may be any of a DMRS, a Channel State Information—Reference Signal (CSI-RS), a Tracking Reference Signal (TRS), a Phase Tracking Reference Signal (PTRS), a Cell-specific Reference Signal (CRS), and a Sounding Reference Signal (SRS).

(Time Intervals)

In the present disclosure, time resource units are not limited to one or a combination of slots and symbols, and may be time resource units, such as frames, superframes, subframes, slots, time slot subslots, minislots, or time resource units, such as symbols, Orthogonal Frequency Division Multiplexing (OFDM) symbols, Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

(Frequency Bands)

The present disclosure may be applied to any of a licensed band and an unlicensed band.

(Communication)

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

(Antenna Ports)

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

Figure 2:
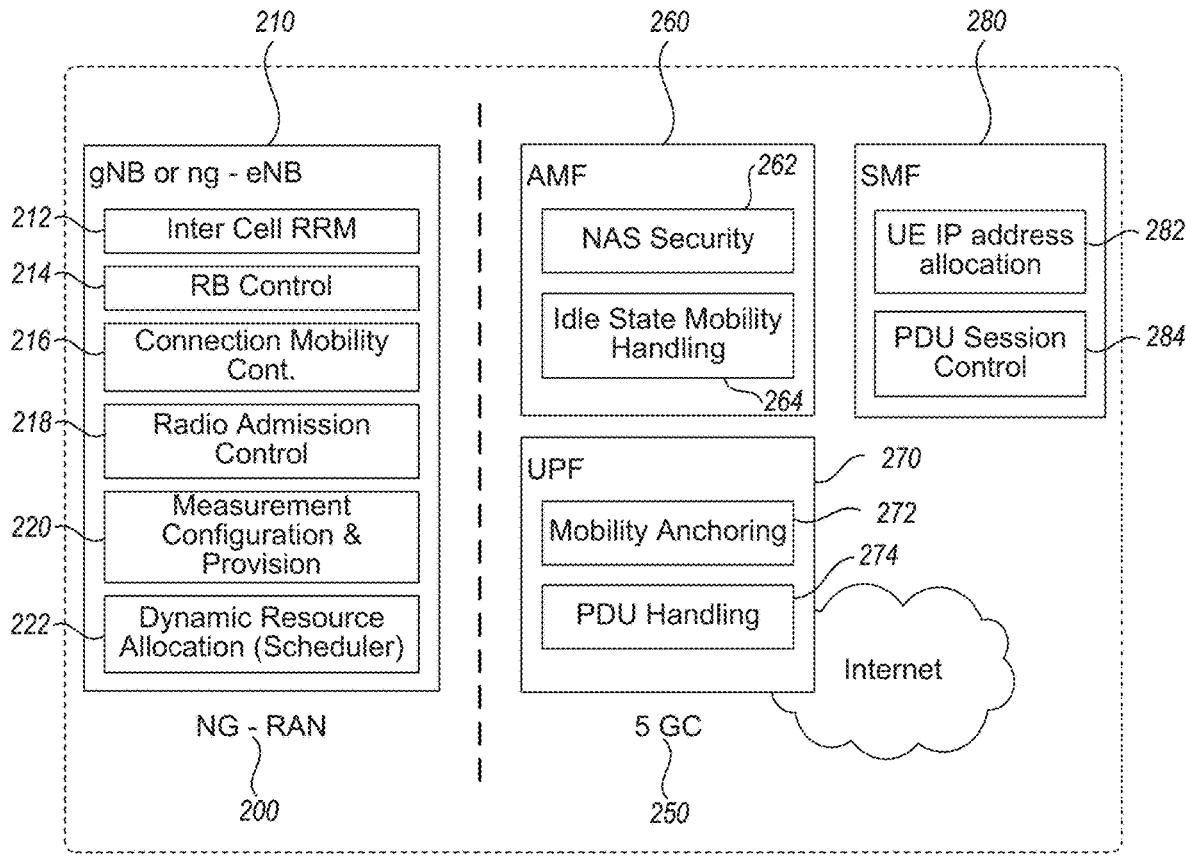
FIG. 2 is a schematic drawing which shows functional split between NG-RAN and 5GC.

FIG. 2 illustrates the functional split between NG-RAN 200 and 5GC 250. The NG-RAN logical node is a gNB or ng-eNB 210. The 5GC 250 has logical nodes AMF 260, UPF 270 and SMF 280.

In particular, the gNB and ng-eNB 210 host the following main functions:

Functions for Radio Resource Management 212 such as Radio Bearer Control 214, Radio Admission Control 218, Connection Mobility Control 216, Dynamic allocation of resources to UEs in both uplink and downlink (scheduling) 222;

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or OAM);

Measurement and measurement reporting configuration for mobility and scheduling 220;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity; and

Tight interworking between NR and E-UTRA.

The Access and Mobility Management Function (AMF) 260 hosts the following main functions:

Non-Access Stratum (NAS) signalling termination;

NAS signalling security 262;

Access Stratum (AS) Security control;

Inter Core Network (CN) node signalling for mobility between 3GPP access networks;

Idle mode UE Reachability (including control and execution of paging retransmission) 264;
Registration Area management;
Support of intra-system and inter-system mobility;
Access Authentication;
Access Authorization including check of roaming rights;
Mobility management control (subscription and policies);
Support of Network Slicing; and
Session Management Function, (SMF) selection.

Furthermore, the User Plane Function (UPF) hosts the following main functions:

Anchor point for Intra-/Inter-RAT mobility (when applicable) 272;
External PDU session point of interconnect to Data Network 274;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g., packet filtering, gating, UL/DL rate enforcement;
Uplink Traffic verification (SDF to QoS flow mapping); and
Downlink packet buffering and downlink data notification triggering.

Finally, the Session Management function (SMF) 280 hosts the following main functions:

Session Management 284;
UE IP address allocation and management 282;
Selection and control of UP function;
Configures traffic steering at User Plane Function (UPF) to route traffic to proper destination;
Control part of policy enforcement and QoS; and
Downlink Data Notification.

RRC Connection Setup and Reconfiguration Procedures

Figure 3:
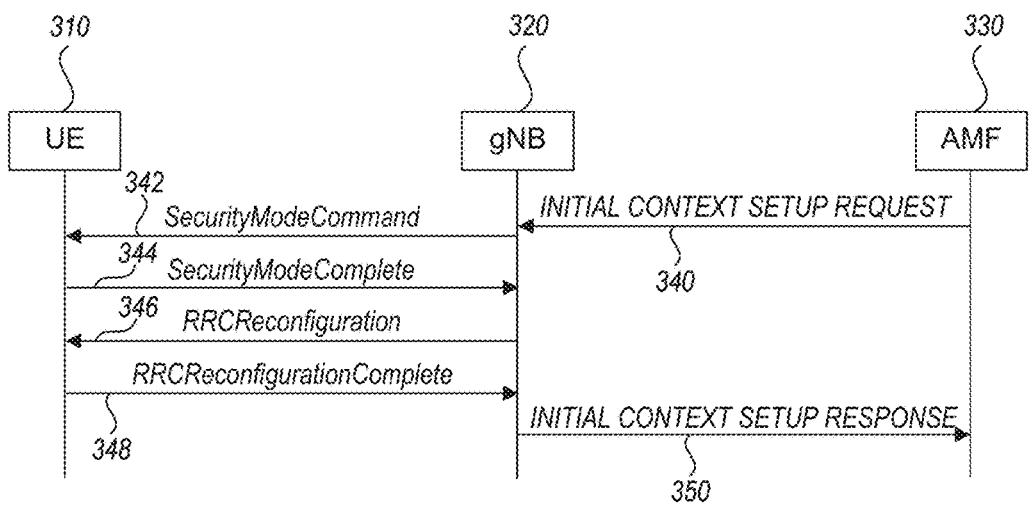
FIG. 3 is a sequence diagram for radio resource control (RRC) connection setup/reconfiguration procedures.

FIG. 3 illustrates some interactions between a UE 310, a gNB 320, and an AMF 330 (a 5GC entity) in the context of a transition of the UE from RRC_IDLE to RRC_CONNECTED for the NAS part (see TS 38.300 v15.6.0).

Radio resource control (RRC) is a higher layer signalling (protocol) used for UE and gNB configuration. In particular, this transition involves that the AMF 330 prepares the UE context data (including e.g. PDU session context, the Security Key, UE Radio Capability and UE Security Capabilities, etc.) and sends it to the gNB 320 with the INITIAL CONTEXT SETUP REQUEST 340. Then, the gNB 320 activates the AS security with the UE 310, which is performed by the gNB transmitting to the UE a SecurityModeCommand message 342 and by the UE 310 responding to the gNB 320 with the SecurityModeComplete message 344. Afterwards, the gNB 320 performs the reconfiguration to setup the Signalling Radio Bearer 2, SRB2, and Data Radio Bearer(s), DRB(s) by means of transmitting to the UE 310 the RRCReconfiguration message 346 and, in response, receiving by the gNB 320 the RRCReconfigurationComplete 348 from the UE 310. For a signalling-only connection, the steps relating to the RRCReconfiguration are skipped since SRB2 and DRBs are not setup. Finally, the gNB 320 informs the AMF 330 that the setup procedure is completed with the INITIAL CONTEXT SETUP RESPONSE 350.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signalling radio bearer setup between the gNodeB and a user equipment (UE). In particular, the gNodeB transmits a Radio Resource Control (RRC) signalling containing a resource allocation configuration information element to the UE via the signalling radio bearer. The UE then performs an uplink transmission or a downlink reception based on the resource allocation configuration.

Usage Scenarios of IMT for 2020 and Beyond

Figure 4:
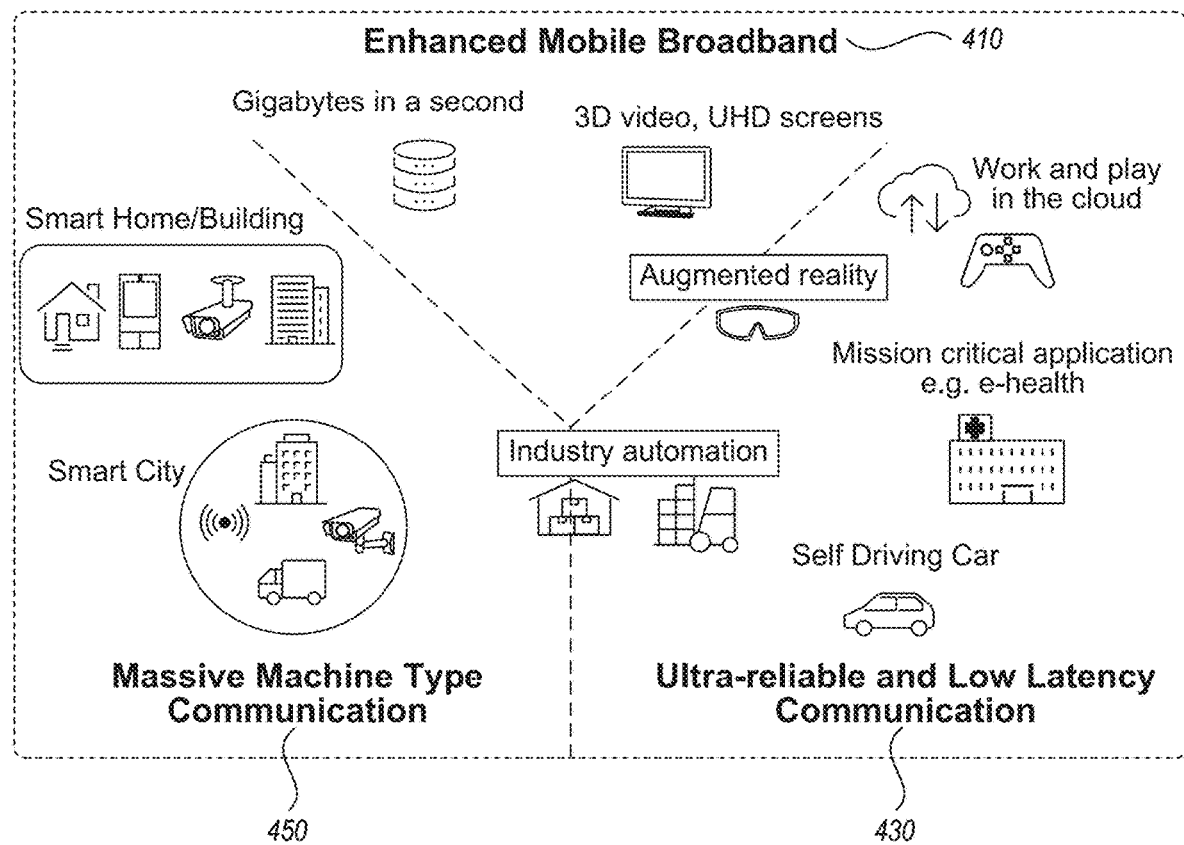
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) 410 has been concluded. In addition to further extending the eMBB 410 support, the current and future work would involve the standardization for ultra-reliable and low-latency communications (URLLC) 430 and massive machine-type communications 450. FIG. 4 illustrates some examples of envisioned usage scenarios for IMT for 2020 and beyond (see e.g. ITU-R M.2083 FIG. 2).

The URLLC use case 430 has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC 430 is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC 430 requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC 430, more compact downlink control information (DCI) formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC 430 aim at latency improvement and reliability improvement. Technology enhancements for latency improvement include configurable numerology, non-slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) 450 is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC 430 and mMTC 450, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC 430, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few microseconds ($\mu s$) where the value can be one or a few microseconds depending on frequency range and short latency in the order of 0.5 to 1 millisecond (ms) in particular a target user plane latency of 0.5 milliseconds, depending on the use cases.

Moreover, for NR URLLC 430, several technology enhancements from the physical layer perspective have been identified. Among these are Physical Downlink Control Channel (PDCCH) enhancements related to compact DCI, PDCCH repetition, increased PDCCH monitoring. Moreover, Uplink Control Information (UCI) enhancements are related to enhanced Hybrid Automatic Repeat Request (HARQ) and CSI feedback enhancements. Also, PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g. as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QOS Flows with DRBs.

Figure 5:
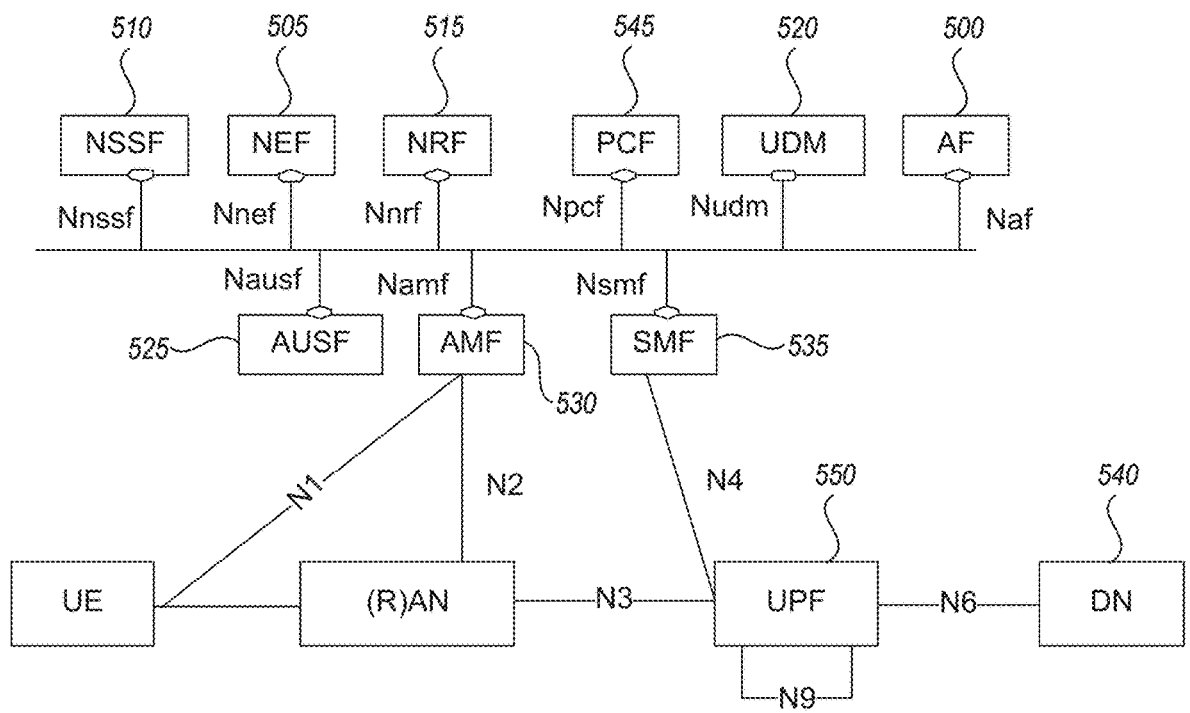
FIG. 5 is a block diagram showing an exemplary 5G system architecture for a non-roaming scenario.

FIG. 5 illustrates a 5G NR non-roaming reference architecture (see TS 23.501 v16.1.0, section 4.23). An Application Function (AF) 500, e.g. an external application server hosting 5G services, exemplarily described in FIG. 4, interacts with the 3GPP Core Network in order to provide services, for example to support application influence on traffic routing, accessing Network Exposure Function (NEF) 505 or interacting with the Policy framework for policy control (see Policy Control Function, PCF), e.g. QoS control. Based on operator deployment, Application Functions 500 considered to be trusted by the operator can be allowed to interact directly with relevant Network Functions. Application Functions 500 not allowed by the operator to access directly the Network Functions use the external exposure framework via the NEF 505 to interact with relevant Network Functions.

FIG. 5 shows further functional units of the 5G architecture, namely Network Slice Selection Function (NSSF) 510, Network Repository Function (NRF) 515, Unified Data Management (UDM) 520, Authentication Server Function (AUSF) 525, Access and Mobility Management Function (AMF) 530, Session Management Function (SMF) 535, and Data Network (DN) 540, e.g. operator services, Internet access or 3rd party services. All of or a part of the core network functions and the application services may be deployed and running on cloud computing environments.

In the present disclosure, thus, an application server (for example, AF 500 of the 5G architecture), is provided that comprises a transmitter, which, in operation, transmits a request containing a QoS requirement for at least one of URLLC, eMMB and mMTC services to at least one of functions (for example NEF 505, AMF 530, SMF 535, PCF 545, UPF 550, etc) of the 5GC to establish a PDU session including a radio bearer between a gNodeB and a UE in accordance with the QoS requirement and control circuitry, which, in operation, performs the services using the established PDU session.

Figure 6:
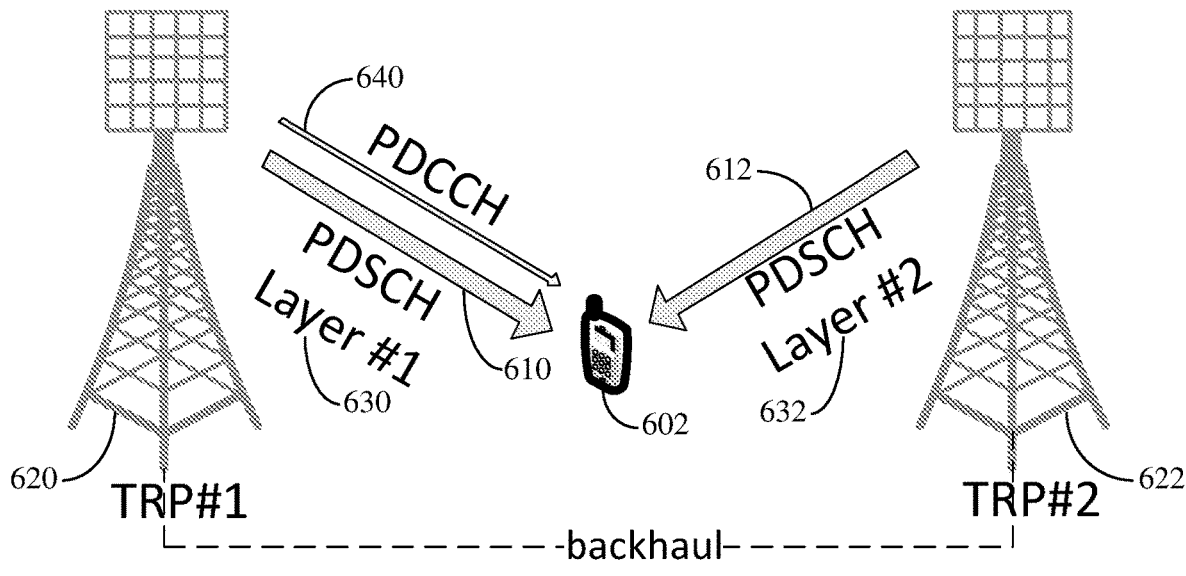
FIG. 6 is an illustration of a single downlink control information (DCI) based multiple transmission and reception points (M-TRP) ultra-reliable and low-latency communication (URLLC) system.

FIG. 6 shows an illustration of a single downlink control information (DCI) based multiple transmission and reception points (M-TRP) ultra-reliable and low-latency communication (URLLC) network 600. M-TRP transmission is used for overcoming blockage effects and improve performance of cell-edge UEs 602. In a single DCI-based M-TRP URLLC transmission, the network 600 schedules a PDSCH transmission 610, 612 from multiple TRPs (i.e., TRP 1 620 and TRP 2 622), where the PDSCH 610, 612 from the different TRPs 620, 622 are transmitted in different layers (i.e., layer 1 630 and layer 2 632).

To facilitate further down-selection for one or more schemes in RAN1 #96bis, schemes for multi-TRP based URLLC, scheduled by single DCI at least, are clarified by the following schemes 2, 2a and 2b referring to Frequency-Division Multiplexing (FDM), and schemes 3 and 4 referring to Time-Division Multiplexing (TDM).

Scheme 2 (FDM): $n(n \leq N_f)$ TCI states within a single slot, with non-overlapped frequency resource allocation. Each non-overlapped frequency resource allocation is associated with one TCI state and the same single/multiple DMRS port(s) are associated with all non-overlapped frequency resource allocations.

Scheme 2a (FDM): A single codeword with one RV is used across full resource allocation. From UE perspective, the common RB mapping (codeword to layer mapping as in Rel-15) is applied across full resource allocation.

Scheme 2b (FDM): A single codeword with one RV is used for each non-overlapped frequency resource allocation. The RVs corresponding to each non-overlapped frequency resource allocation can be the same or different. Applying different MCS/modulation orders for different non-overlapped frequency resource allocations can be discussed.

Details of frequency resource allocation mechanism for FDM 2a/2b with regarding to allocation granularity, time domain allocation can also be discussed.

Scheme 3 (TDM): n(n≤Nt1) TCI states within a single slot, with non-overlapped time resource allocation. Each transmission occasion of the TB has one TCI and one RV with the time granularity of a mini-slot. All transmission occasion(s) within the slot use a common MCS with same single or multiple DMRS port(s). The RV/TCI state can be the same or different among transmission occasions. The FFS channel estimation interpolation across mini-slots with the same TCI index.

Scheme 4 (TDM): n(n≤Nt2) TCI states with K (n<=K) different slots. Each transmission occasion of the TB has one TCI and one RV. All transmission occasion (s) across K slots use a common MCS with same single or multiple DMRS port(s). The RV/TCI state can be the same or different among transmission occasions. And the FFS channel estimation interpolation across slots with the same TCI index.

Note that M-TRP/panel based URLLC schemes shall be compared in terms of improved reliability, efficiency, and specification impact and support of number of layers per TRP may be discussed.

For FDM, scheme 2a and 2b set the number of transmission configuration indication(TCI) states at 2 which supports up to two transmission layers in accordance with scheme 2a. For TDM, schemes 3 and 4 also set the number of TCI states at 2. Resource allocation in the time domain supports the same number of consecutive symbols scheduled for each transmission occasion. For scheme 3, all transmission occasions are in a single slot by network (NW) implementation without dropping and FFS for downlink/uplink (DL/UL) switching within a slot.

Figure 7:
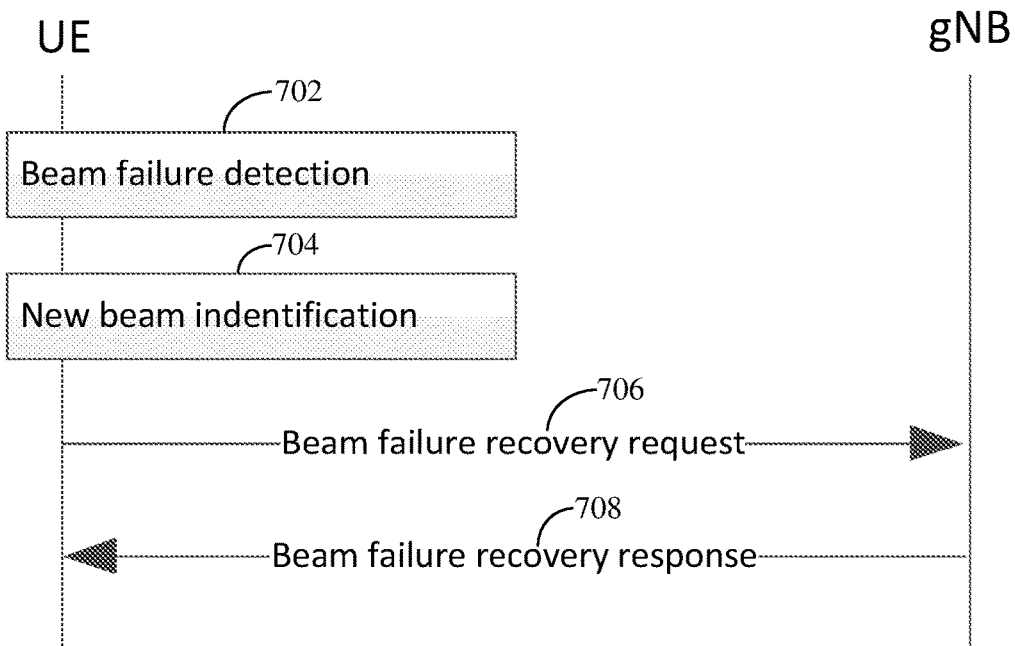
FIG. 7 is an illustration of a general beam failure recovery (BFR) process.

A UE can be configured to receive PDSCH from up to two TRPs, according to the number of configured TCI states. FIG. 7 is an illustration of a general beam failure recovery (BFR) process 700 which includes four main steps. The first step is beam failure detection(BFD) 702. The UE is provided a list of reference signals (RSs) by failureDetectionResources for detecting beam failure, or, if no RSs are provided by failureDetectionResources, the UE performs the BFD 702 based on a TCI state for PDCCH/PDSCH receptions (see Section 6 of TS 38.213 and Section 8.5 of TS 38.133).

The next step is new beam identification(NBI) 704 (also known as candidate new beam detection(CBD)). The UE is provided a list of CBD RSs by candidateBeamRSList.

Steps 702 and 704 occur within the UE 705. Once a new beam is identified, the UE 705 transmits a beam failure recovery request (BFRQ) 706 to an associated gNB 710. In response thereto, the gNB 710 sends a beam failure recovery response (BFRR) 708 and the BFR process 700 is complete.

Figure 8:
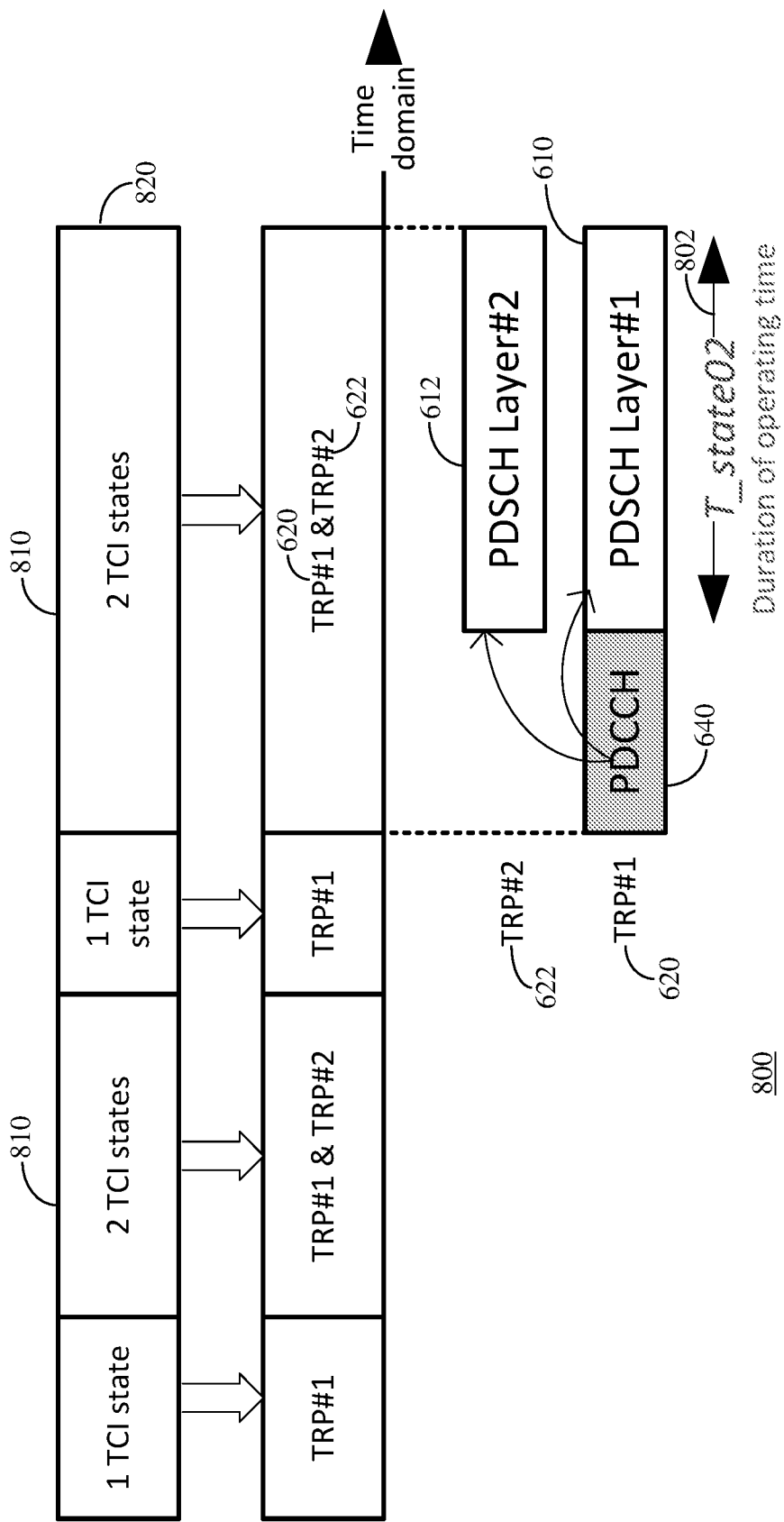
FIG. 8 is an illustration of a user equipment (UE) simultaneously receiving physical downlink shared channel (PDSCH) from a first and a second TRP.

As seen in FIG. 6, a UE 602 is configured to receive PDSCH 610, 612 from both TRP #1 620 and TRP #2 622 where the TRP which is configured to transmit a PDCCH 640 by higher layer signalling is named as TRP #1 620. FIG. 8 is an illustration 800 of a user equipment (UE) simultaneously receiving physical downlink shared channels (PDSCH) 610, 612 from the first TRP (TRP #1) 620 and the second TRP (TRP #2) 622, respectively. The UE 602 is configured to simultaneously receive PDSCHs 610, 612 from TRP #1 620 and TRP #2 622 in a duration of operating time (T_state #2) 802 according to two TCI states 810 indicated in the TCI codepoint 820.

Figure 9:
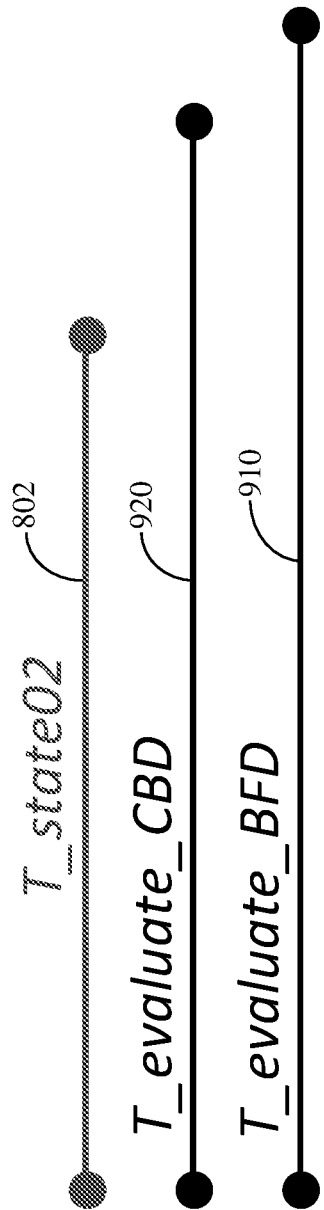
FIG. 9 is an illustration of durations of operating time for beam failure detection (BFD) and candidate new beam detection (CBD) during a BFR process.

FIG. 9 is an illustration 900 of durations of operating time for beam failure detection(BFD) 910 and candidate new beam detection(CBD) 920 during a BFR process. The UE utilizes measurement effort and power consumption for evaluating BFD and/or CBD relating to TRP #2 while not improving performance when the duration of operating time 802 is not greater than the required BFD evaluation time 910 and/or the CBD evaluation time 920. The UE required BFD evaluation time 910 (T_evaluate_BFD) and the CBD evaluation time 920 (T_evaluate_CBD) which are defined in Sec. 8.5.3 of 38.133 and Sec. 5.17 of 38.321, respectively.

In accordance with the present embodiments, the UE includes circuitry, which in operation, receives signals from the M-TRPs and performs BFR from two or more M-TRPs by (a) evaluating BFD and CBD for the signals from at least a first TRP with physical downlink control channel (PDCCH), and (b) skipping evaluation of one or both of the BFD and the CBD in response to one or more operational conditions. In this manner, the UE reduces measurement effort and power consumption. In addition, adoption of the measurement effort and power consumption by UEs in a network enables flexibility of the M-TRP URLLC.

In order to evaluate BFD for two or more M-TRPs, multiple sets of BFD reference signals (BFD-RSs) can be configured explicitly or implicitly to the UE, wherein each set is configured with each of multiple TRPs, i.e., BFD-RS set per TRP. In an explicit manner, a BFD-RS set per TRP can be configured as a set of periodic channel state information reference signals (CSI-RSs) or synchronization signal blocks (SSBs). In an implicit manner, a BFD-RS set per TRP can be implicitly configured as the quasi co-location (QCL) reference signals for the corresponding CORESETs of this TRP based on its own TCI state. Similarly, for evaluating CBD for two or more M-TRPs, multiple sets of CBD reference signals (CBD-RSs) (or NBI reference signals (NBI-RSs)) can be explicitly or implicitly configured per TRP. It should be appreciated that these independent configurations of BFD-RS set per TRP and/or CBD-RS set per TRP are applicable through all the present embodiments.

By configurating independent set of BFD-RSs per TRP, if a set of BFD-RSs from one of multiple TRPs is identified as failed (i.e., the beam of one of multiple TRPs is identified as failed), a beam failure recovery procedure for this specific TRP can be triggered. It can be considered as partial or TRP-specific beam failure recovery. It is beneficial to reduce the overall beam failure recovery latency and improve the multi-TRP/panel transmission efficiency, as compared with a scenario of use-case for only triggering beam failure recovery procedure when all sets of BFD-RSs configured for all TRPs are identified as failed (or all beams of all TRPs are identified as failed).

Furthermore, there could be several other BFR parameters to be configured based on TRP level. For an example, it is assumed to have two TRPs (e.g., TRP #1 and TRP #2) in operation. Hence, two sets of thresholds such as BFD thresholds (Q_out) and CBD thresholds (Q_in), two sets of timers such as BFD timers and BFR timers, as well as two sets of beam failure instance (BFI) counters and their corresponding maximum numbers of BFI indications (BFIIs) can be independently configured for TRP #1 and TRP #2, respectively.

Figure 10:
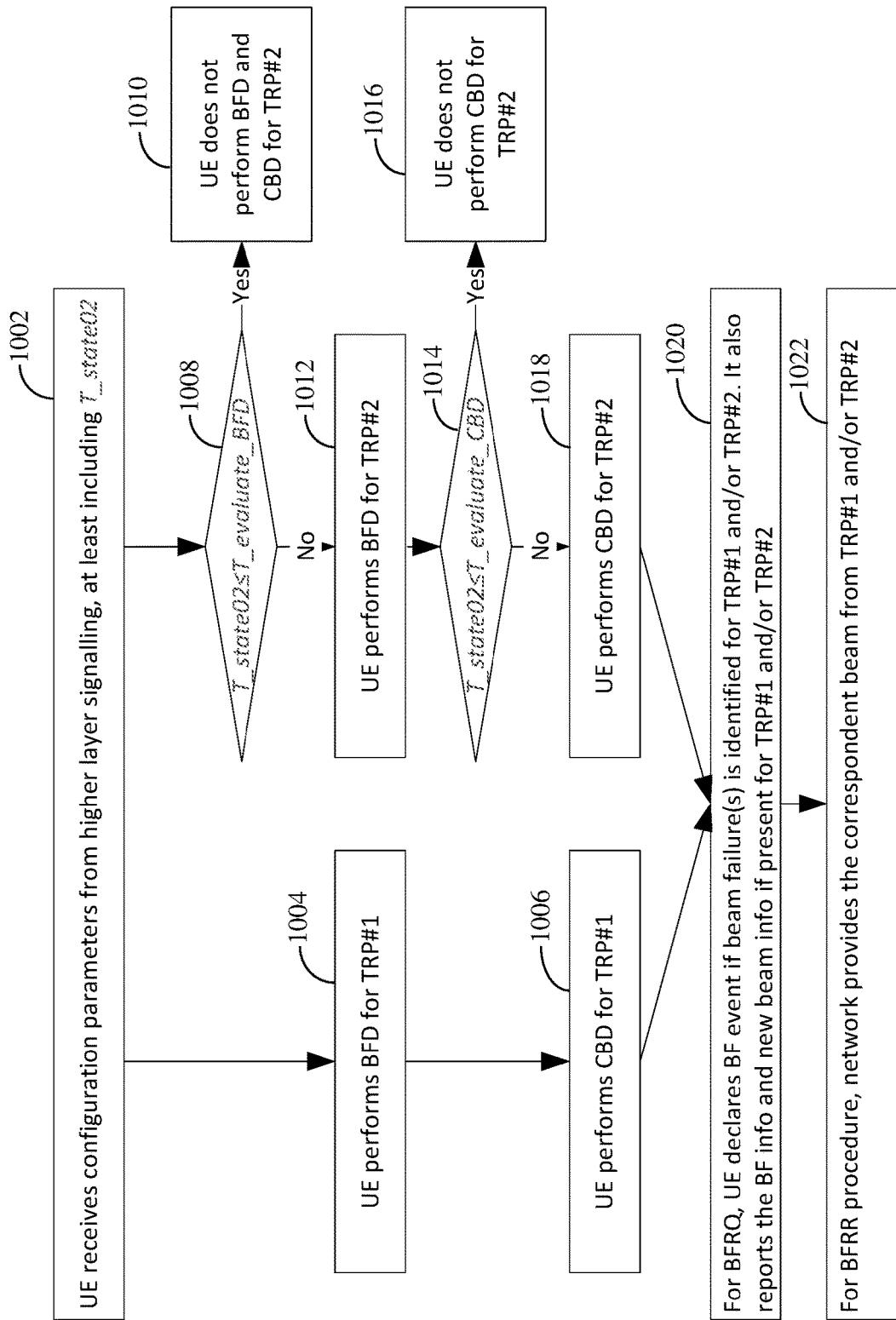
FIG. 10 is an illustration of a first BFR process in accordance with the present disclosure.

FIG. 10 is an illustration of a first BFR process in accordance with the present disclosure. The first BFR process queues off the duration of operating time as shown in FIG. 9. In addition, TRP #1 620 is the one of the M-TRPs which transmits the PDCCH 640 by higher layer signalling.

Initially, the UE receives 1002 configuration parameters from higher layer signalling from the M-TRPs (i.e., on PDCCH 640 from TRP #1 620) including at least an indication pointing to a proper duration of operating time for TRP #2 622 (e.g., T_state02 802). The proper duration of operating time can be a static value for a network (for example, T_state02 can be defined based on the duration of operating time for TRP #1 620 plus an offset) or can be dynamically determined by the network based on realistic environment conditions or the network configuration. An example of a dynamic calculation of a proper duration of operating time by using at least DCI, MAC CE, or RRC signalling is shown in Equation 1:

$$T\_state02 = \text{duration of operating time for } TRP\ \#1 - \text{PDCCH transmission duration} - \text{an offset} \quad (1)$$

The offset may be an activation time or delay for TRP #2, if any.

Moreover, different from above description, there could be another possibility that T_state02 is configured as a duration of operating time or a window, wherein both two TCI states are activated, or both TRP #1 and TRP #2 are activated in operation.

Next, the UE performs beam failure detection and recovery for TPR #1 as specified in Rel-15/16 by performing BFD 1004 for TRP #1 and performing CBD 1006 for TRP #1.

In particular, the UE continuously monitors set of BFD-RSs configured for TRP #1 to detect beam failure 1004. In particular, when the quality of link level for all the corresponding BFD-RS resources is above a threshold in a time instance (this BFD threshold Q_out is defined as the level at which the downlink radio link cannot be reliably received, and it corresponds to the block error rate outage (BLER_out) of a hypothetical PDCCH transmission), a BFI can be identified. The physical layer (PHY) provides a BFI indication to the Media Access Control (MAC) layer. The BFD procedure 1004 in MAC is dictated by a timer and a counter which calculates the number of BFIIs. Every time the BFII is received, the timer is restarted and in the case the timer expires, the counter is reset. On the other hands, after detecting $N_{max}$ (beamFailureInstanceMaxCount) consecutive BFIIs, the UE can declare that beam failure happens for TRP #1. Following that, CBD 1006 for TRP #1 is triggered. The UE monitors the quality of link level of a set CBD-RSs (e.g., sets of CSI-RS or SSBs) for re-establishing connectivity. The UE measures the L1 reference signal received power (L1-RSRP) on the reference signals for a plurality of CBD-RSs. When the measured value of L1-RSRP exceeds a predetermined value, a new beam can be identified.

The UE can skip or perform evaluation(s) of BFD and/or CBD based on the value of T_state02. If the UE determines 1008 that T_state02 is less than or equal to the time to evaluate BFD for TRP #2 (e.g., T_evaluate_BFD 910, FIG. 9), the UE skips 1010 both BFD and CBD. If the UE determines 1008 that T_state02 is greater than T_evaluate_BFD, the UE performs 1012 BFD for TRP #2. The UE then compares the time duration for T_state02 to T_evaluate_CBD 920 to determine 1014 if T_state02 is less than T_evaluate_CBD. If the UE determines 1014 that T_state02 is less than or equal to the time to evaluate CBD for TRP #2 (e.g., T_evaluate_CBD 920), the UE skips 1016 CBD. If the UE determines 1014 that T_state02 is greater than T_evaluate_BFD, the UE performs 1018 CBD for TRP #2.

In the case of performing 1012 BFD for TRP #2, similar to TRP #1, the UE needs to detect $N_{max}$ consecutive BFIIs, then it can declare that beam failure happens based on the set of BFD-RSs for TRP #2. Following that, the evaluation of 1018 CBD is triggered, the UE measures quality of link level such as the L1 reference signal received power (L1-RSRP) on the reference signals for a set of CBD-RSs for TRP #2. In this manner, the 1012 BFD procedure for TRP #2 in MAC layer dictated by a timer and a counter is independently configured, as compared with that of TRP #1. At step 1020, during BFRQ (step 706, FIG. 7), the UE declares a beam failure event if beam failure(s) is identified for TRP #1 and/or TRP #2. For TRP #2, if CBD is skipped, no action or no new beam info due to no action as a default behavior is reported. The UE reports beam failure contents which include (a) beam failure (BF) info for TRP #1 and/or TRP #2, (b) new beam info for TRP #1, if present, and (c) new beam info, no action, or no new beam info due to no action for TRP #2, if present. The UE then receives the BFRR 1024 from the network which provides the correspondent beam from TRP #1 and/or TRP #2.

The BFRQ generated at step 1022 may include beam failure info for each failed TRP such as a beam failure index of the corresponding TRP, a TRP index, or a configuration index. The BFRQ transmitted at step 1022 may also include report content for TRP #1 and/or TRP #2 and is reported to the network via at least an uplink control information(UCI) message, a medium access control layer control element (MAC CE) message or a radio resource control (RRC) message.

In this manner, if the UE detects beam failure of any TRP from multiple TRPs, herein for an example TRP #2 is failed, the UE could send BFRQ including beam failure information and new beam information for the failed TRP to a working TRP #1. The working TRP #1 could then transfer the BFRQ to the failed TRP #2 through the backhaul this is because it could have the most recent and available uplink resources to carry the BFRQ. On the other words, the BFRQ procedure for M-TRP operation should be transmitted via a link with good channel condition. If the backhaul is ideal, i.e., the backhaul latency is assumed to be satisfied a requirement or close to zero latency, the BFR procedure can work well. If the backhaul is not ideal or there is no new beam information of the failed TRP #2 reported by the UE, the working TRP #1 could decide to indicate to the UE to switch from a multi-TRP operation mode to a single-TRP operation mode. This situation happens when the backhaul latency is not suitable for the delay requirement of BFR procedure configured by the BFR timer or the UE may not be able to reach the failed TRP #2 due to a complete blockage. The TRP transmitting the PDCCH at higher levels may be configured based on a RRC configuration. For example, assuming there are two TRPs (TRP A and TRP B) in operation, for a first RRC configuration, TRP A may be configured to transmit the PDCCH and, thus, becomes the primary TRP or TRP #1 while TRP B is TRP #2. Alternatively, for a second RRC configuration, TRP B may be configured to transmit the PDCCH, in which case TRP B becomes the primary TRP or TRP #1 while TRP A is TRP #2. In this manner, the flexibility of the M-TRP URLLC operation is enabled.

In addition, multiple TRPs can be configured to work under carrier aggregation(CA) framework by higher layer parameters. Particularly, the TRP A could be configured to work as a primary cell (PCell) or primary TRP, while the TRP B could be configured to work as a secondary cell (SCell) or secondary TRP. In this manner, either the BFR procedure proposed in the present embodiments or Rel. 16 BFR for multiple SCells with some enhancements can be used.

Moreover, up to two separate scheduling request (SR) configurations comprising separate PUCCH resources, i.e., SR-PUCCH resource(s), could be assigned to send the BFRQ for the two TRP #1 and TRP #2. When there is one common SR-PUCCH resource is assigned for both TRP #1 and TRP #2, if any TRP is failed, the UE can send the BFRQ for the failed TRP to the working TRP based on this common SR-PUCCH resource. When there are two separate allocated SR-PUCCH #1 and SR-PUCCH #2 for TRP #1 and TRP #2, respectively, if TRP #2 is failed, the UE can send the BFRQ information for the TRP #2 to the working TRP #1 based on one of the assigned SR-PUCCH #1 and SR-PUCCH #2 resources. For more than two TRPs in operation, multiple TRPs can be grouped into multiple groups, where each group can be assigned with a SR-PUCCH resource for sending the BFRQ information. For instance, there are two groups of TRPs, wherein the first group include the primary TRP (or TRP #1) and the second group includes the remaining TRPs (or secondary TRPs), hence SR-PUCCH #1 and SR-PUCCH #2 resources can be assigned for the first and second groups, respectively. However, as mentioned earlier above, there could be a common SR-PUCCH resource assigned for both groups for sending the BFRQ information. This can be up to a network implementation or a pre-configured rule in the specifications.

Figure 11:
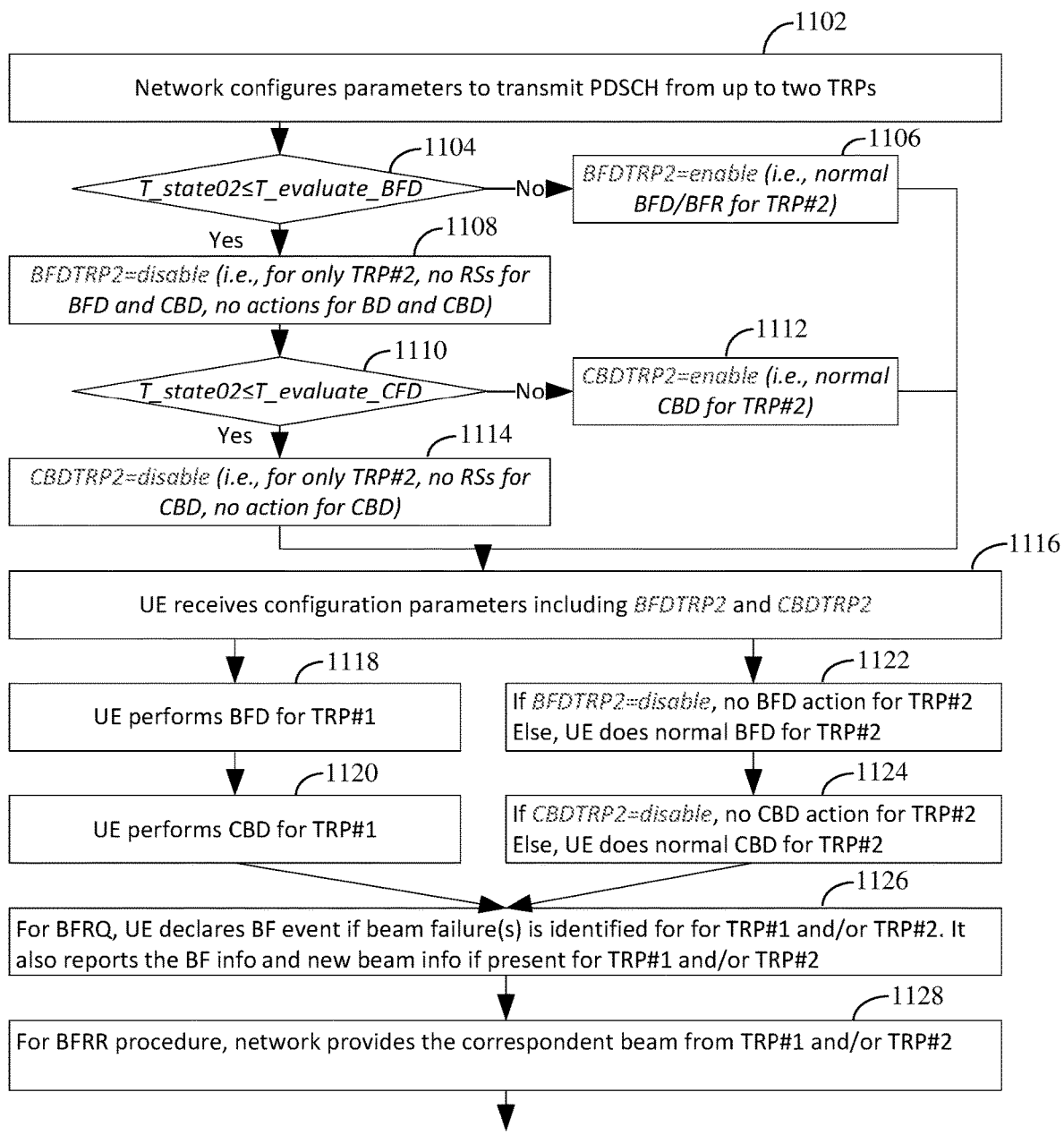
FIG. 11 is an illustration of a second BFR process in accordance with the present disclosure.

As noted in FIG. 8, the UE is configured to simultaneously receive independent PDSCH 610 from TRP #1 and independent PDSCH 612 from TRP #2 in a duration of T_state02. FIG. 11 is an illustration of a second BFR process in accordance with the present disclosure. Initially, the network configures parameters 1102 to transmit PDSCH from up to two TRPs (e.g., TRP #1 and TRP #2). As seen in FIG. 10, the UE will always perform both BFD and CBD for TRP #1. In order to assist the UE to conserve power, the network decides whether the UE is to perform either or both of BFD and CBD for TRP #2 and transmits explicit indication to the UE.

The network decides whether the UE is to perform either or both of BFD and CBD for TRP #2 by first deciding 1104 whether T_state02 is less than or equal to T_evaluate_BFD. If T_state02 is greater than T_evaluate_BFD 1104, the network sets a parameter BFDTRP2 to enable 1106 indicating that the UE will perform normal BFD/BFR for TRP #2. If T_state02 is less than or equal to T_evaluate_BFD 1104, the network sets the parameter BFDTRP2 to disable 1108 indicating that the UE will not perform both BFD and CBD for TRP #2.

The network next decides 1110 whether T_state02 is less than or equal to T_evaluate_CBD. If T_state02 is greater than T_evaluate_CBD 1110, the network sets a parameter CBDTRP2 to enable 1112 indicating that the UE will perform normal CBD for TRP #2. If T_state02 is less than or equal to T_evaluate_CBD 1110, the network sets the parameter CBDTRP2 to disable 1114 indicating that the UE will not perform CBD for TRP #2 1110.

The decision criteria for steps 1104 and 1110 is up to gNB implementation and other criteria maybe used. The network then transmits and the UE receives 1116 the parameters BFDTRP2 and CBDTRP2. The BFDTRP2 and CBDTRP2 values can be configured and updated by using at least DCI, MAC CE, or RRC signalling.

In addition, the BFD and/or CBD parameter can be implicitly configured to the UE by interpreting indication(s) for configuring set of BFD-RSs and/or NBI-RSs. Herein, for an example, it is assumed that two sets of BFD-RSs for TRP #1 and TRP #2, and two sets of CBD-RSs for TRP #1 and TRP #2 are configured. The UE understands implicitly that it needs to perform evaluations of BFD and CBD for both TRP #1 and TRP #2.

Next, the UE performs beam failure detection and recovery for TPR #1 as specified in Rel-15/16 by performing BFD 1118 for TRP #1 and performing CBD 1120 for TRP #1, as similar to procedures of BFD 1004 and CBD 1006, respectively. The UE performs beam failure detection and recovery for TPR #2 in response to the values for BFDTRP2 1122 and CBDTRP2 1124. At step 1122, if the value of BFDTRP2 is "disable", no BFD action is performed for TRP #2, otherwise BFD is performed for TRP #2. At step 1124, if the value of CBDTRP2 is "disable", no CBD action is performed for TRP #2, otherwise CBD is performed for TRP #2.

During BFRQ 1126, the UE declares a BF event if beam failure(s) is identified for TRP #1 and/or TRP #2. The UE reports the BF contents which may include BF info for TRP #1 and/or TRP #2, new beam info for TRP #1 if present, and/or for TRP #2 new beam info, no action, or no new beam info due to no, if present. Finally, at step 1128 the network generates and transmits a BFRR which includes correspondent beam information from TRP #1 and/or TRP #2.

In this manner, the network reduces the number of reference signals (RSs) for the UE due to no configuring RSs of BFD and/or CBD and due to the T_state02 not being sent to the UE. In addition, the UE reduces measurement effort and power consumption.

As the operation of FIG. 11 involves network explicit indication being determined for a TRP, certain conditions based on the described network explicit indications can be extended to more than two TRPs, such as BFDTRP(disable/enable) and/or CBDTRP(disable/enable) can be determined independently per TRP and can be sent to the UE for use with the corresponding TRPs. Alternatively, a common BFDTRP value (i.e., disable or enable) and/or a common CBDTRP value (i.e., disable or enable) can be indicated for all TRPs, respectively.

Another operational condition which can allow the UE to reduce measurement effort and power consumption in accordance with the present disclosure is to define a new timer value (i.e., an active duration of operating time, T_state02) for each individual TRP. The new timer is configured to the UE. In this manner, a TRP is activated for communication with the UE via a TCI state activation MAC CE and is deactivated either when the UE receives a TCI state deactivation MAC CE or when the timer expires. The timer value is indicated to the UE by using at least DCI (per TCI state), MAC CE, or RRC signalling.

Since BFD and CBD for TRP #1 is always performed, the timer value for TRP #1 is configured as a symbolic value, such as infinity, so that there is no timer-based deactivation. For TRP #2, the timer value (T_state02) is configured as a finite value (i.e., TRP #2 is active on a demand basis). Since the timer value is a finite value, the evaluations of BFD/CBD for TRP #2 can be skipped as follows: if T_state02≤T_evaluate_BFD, the UE skips BFD and CBD; and if T_state02>T_evaluate_BFD while T_state02≤T_evaluate_CBD, the UE performs BFD and skips CBD.

The beam failure of TRP #2 is reported if it is identified, and no action or no new beam information due to no action as a default behavior is reported. This further enables flexibility of the M-TRP URLLC operation and reduces measurement effort and power consumption from the UE. In addition, an explicit deactivation for TRP #2 (i.e., TCI state deactivation MAC CE) is not necessary, since it occurs in response to the expiration of the timer.

A network is enabled to support $N_{max}$ TRPs transmissions with a single-DCI, where $N_{max}$ is a (pre)-configured value in the network specifications. For a high-level solution, the evaluations of BFD and CBD are skipped based on a flexible value of $N_{UE}$, where $N_{UE}$ is the maximum number of TRPs that the UE has a capability to be associated with. The value of $N_{UE}$ is indicated by using at least DCI, MAC CE, or RRC signalling.

If $N_{max}>N_{UE}$, the evaluations of BFD and CBD for ($N_{max}-N_{UE}$) TRPs are skipped. A list of $N_{UE}$ values can be selected by a configured rule, such as a list of TRPs with strongest RSRPs, indices in ascending/deascending order, or other rules. Since the setting value of $N_{UE}$ depends on the UE capability, the value of $N_{UE}$ is flexible, thereby enabling flexibility of the M-TRP URLLC operation and reducing measurement effort and power consumption from the UE.

For another high-level solution, the evaluations of BFD and CBD are skipped based on a (pre)-fixed value of $N_{min}$, where $N_{min}$ is the number of TRPs which are required to be evaluated by the UE. If $N_{max}>N_{min}$, the evaluations of BFD and CBD for ($N_{max}-N_{min}$) TRPs are skipped. A list of $N_{min}$ can be selected by a (pre-)configured rule, such as a list of TRPs with a strongest RSRPs, indices in ascending/deascending order, or other rules. This methodology of setting the value of $N_{min}$ provides consistency for the whole network. In addition, it reduces the BFD measurement effort for the UE because it only requires to evaluate BFD and CBD for $N_{min}$ TPRs.

It should be noted that while the flowcharts of FIGS. 10 and 11 and their accompanying discussion as well as the discussion of the timer configuration discuss scenarios for two TRPs, these proposed methodologies are directly applicable to the scenario of N TRPs, i.e., T_stateN, BFDTPRN, and CBDTRPN for supporting N TRPs URLLC transmission with single-DCI. The value of N can be a (pre-)configured or flexibly indicated by using at least DCI, MAC CE, or RRC signalling, depending on UE capability.

In addition, although the discussion herein focuses on a scenario of a single DCI-based M-TRP transmission, the discussed methodologies can be applicable to scenarios of multiple DCI-based M-TRP transmission with some modifications. In particular, the evaluations of BFD and/or CBD for each individual TRP can be skipped based on certain conditions which are based on one or a combination of the following: (a) duration of operating time for each individual TRP, (b) network explicit indication, (c) a timer configuration(active duration of time for each individual TRP), (d) the UE capability, and (e) minimum number of TRPs.

Thus, it can be seen that the exemplary embodiments provide multiple structures to enable flexibility of the M-TRP URLLC operation and reduce measurement effort and power consumption from a UE.

The present disclosure can be realized by software, hardware, or software in cooperation with hardware. Each functional block used in the description of each embodiment described above can be partly or entirely realized by a large-scale integration(LSI) such as an integrated circuit, and each process described in each embodiment may be controlled partly or entirely by the same LSI or a combination of LSIs. The LSI may be individually formed as integrated circuit chips, or one chip may be formed so as to include a part or all of the functional blocks. The LSI may include a data input and output coupled thereto. The LSI may be referred to as an integrated circuit (IC), a system LSI, a super LSI, or an ultra LSI depending on a difference in the degree of integration. However, the technique of implementing an integrated circuit is not limited to the LSI and may be realized by using a dedicated circuit, a general-purpose processor, or a special purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrate circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include a radio frequency (RF) module including amplifiers, RF modulators/demodulators and the like, and one or more amplifiers, RF modulators/demodulators and the like, and one or more antennas. The processing/control circuitry may include power management circuitry which may comprise dedicated circuitry, a processor and instructions for power management control as either firmware or instructions stored in a memory coupled to the processor.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (e.g., digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)". The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus may also include an infrastructure facility, such as a base station, an access point, and any other apparatus, device or system that communicates with or controls apparatuses such as those in the non-limiting examples provided herein.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the present disclosure in any way. Rather, the foregoing detailed description will provide those skilled in the art with a convenient road map for implementing exemplary embodiments, it being understood that various changes may be made in the function and arrangement of the network and/or the UE transceiving apparatus described in the exemplary embodiments without departing from the scope of the present disclosure as set forth in the appended claims.

1. A transceiving apparatus comprising:
   a transceiver, which in operation, receives signals from multiple transmission and reception points (M-TRPs) in a network on at least physical downlink shared channels (PDSCHs); and
   circuitry, which in operation, performs beam failure recovery (BFR) by evaluating beam failure detection (BFD) and candidate new beam detection(CBD) for the signals from a first one of the M-TRPs, wherein the signals from the first one of the M-TRPs comprise signals received on a physical downlink control channel (PDCCH), and wherein the circuitry determines to skip evaluation of one or both of the BFD and the CBD for one or more additional ones of the M-TRPs in response to one or more conditions.

2. The transceiving apparatus in accordance with claim 1 wherein the one or more conditions comprise a duration of operating time for the one or more additional ones of the M-TRPs determined by the circuitry in response to a duration of operation time for performing BFR for the signals from the one or more additional ones of the M-TRPs.

3. The transceiving apparatus in accordance with claim 2 wherein the duration of operating time for the one or more additional ones of the M-TRPs is indicated from one of the M-TRPs by using at least one of a downlink control information(DCI) message, a medium access control layer control element (MAC CE) message or a radio resource control (RRC) message.

4. The transceiving apparatus in accordance with claim 2 wherein the one or more conditions comprise the duration of operating time for the one or more additional ones of the M-TRPs determined in response to a duration of operating time for the first one of the M-TRPs to perform BFR and an offset value.

5. The transceiving apparatus in accordance with claim 4 wherein the one or more conditions comprise the duration of operating time for the one or more additional ones of the M-TRPs determined by the circuitry further in response to a PDCCH transmission time.

6. The transceiving apparatus in accordance with any of claims 2 to 5 wherein the circuitry skips evaluation of both of the BFD and the CBD for the one or more additional ones of the M-TRPs in response to the duration of operating time being not greater than the time for evaluation of the BFD.

7. The transceiving apparatus in accordance with any of claims 2 to 5 wherein the circuitry skips evaluation of the CBD and performs evaluation of the BFD for the one or more additional ones of the M-TRPs in response to the duration of operating time being greater than the time for evaluation of the BFD and not greater than the time for evaluation of the CBD.

8. The transceiving apparatus in accordance with any of the preceding claims wherein the transceiver declares a beam failure event and transmits a beam failure recovery request (BFRQ) to one or more of the M-TRPs, and wherein the BFRQ identifies one or more beam failure (BF) events and reports content for one or more of M-TRPs including BF information and CBD information, wherein, for each of the M-TRPs, the BF information includes a beam failure index, a TRP index or a configuration index, and the CBD information includes the corresponding new beam information when present and default information when no new beam information is present.

9. The transceiving apparatus in accordance with any of the preceding claims wherein the circuitry declares a beam failure event and generates report content for beam failure for one or more of the M-TRPs, and wherein the transceiver transmits the report content to the network via at least one of an uplink control information(UCI) message, a medium access control layer control element (MAC CE) message or a radio resource control (RRC) message.

10. The transceiving apparatus in accordance with claim 9 wherein the report content generated by the circuitry includes beam failure information of one or more of the additional ones of the M-TRPs when identified, as well as CBD information consisting of new beam information for the first one of the M-TRPs when present and default information when no new beam information is present for the one or more additional ones of the M-TRPs.

11. The transceiving apparatus of any of the preceding claims wherein the one or more conditions further comprise a duration of operating time for each individual TRP of the M-TRPs.

12. The transceiving apparatus in accordance with claim 1 wherein the one or more conditions comprise information received by the transceiving apparatus.

13. The transceiving apparatus in accordance with claim 12 wherein the information is indicated by using at least one of a downlink control information(DCI) message, a medium access control layer control element (MAC CE) message or a radio resource control (RRC) message.

14. The transceiving apparatus in accordance with either claim 12 or claim 13 wherein the information comprises a BFD parameter and/or a CBD parameter corresponding to one or more of the additional ones of the M-TRPs, and wherein the circuitry skips evaluation of the BFD in response to the BFD parameter corresponding to the one or more of the M-TRPs and/or skips evaluation of the CBD in response to the CBD parameter corresponding to the one or more of the additional ones of the M-TRPs.

15. The transceiving apparatus in accordance with claim 14 wherein the one or more conditions comprise not receiving reference signals for BFD and/or CBD for the one or more of the additional ones of the M-TRPs and instead receiving the BFD parameter and/or the CBD parameter, 16. The transceiving apparatus in accordance with either claim 14 or claim 15 wherein either or both of the BFD parameter and the CBD parameter are indicated independently for each of the M-TRPs.

17. The transceiving apparatus in accordance with either claim 14 or claim 15 wherein either or both of the BFD parameter and the CBD parameter are common to all of the M-TRPs.

18. The transceiving apparatus in accordance with either claim 12 or claim 13 wherein the information comprises a timer value corresponding to one of the one or more additional ones of the M-TRPs, and wherein the circuitry skips evaluation of the BFD and/or the CBD for the one of the one or more additional ones of the M-TRPs in response to the timer value corresponding to the one of the M-TRPs.

19. The transceiving apparatus in accordance with claim 18 wherein the timer value comprises a finite value, and wherein the transceiving apparatus is deactivated when the timer is expired.

20. The transceiving apparatus in accordance with either claim 12 or claim 13 wherein the information comprises a value corresponding to a maximum number of TRPs that the transceiving apparatus has the capability to be associated with, and wherein the circuitry skips evaluation of the BFD and/or the CBD for one or more of the M-TRPs in response to the value corresponding to the maximum number of TRPs that the transceiving apparatus has the capability to be associated with.

21. The system in accordance with either claim 12 or claim 13 wherein the information comprise a value corresponding to a number of TRPs which are required to be evaluated by the transceiving apparatus, and wherein the circuitry skips evaluation of the BFD and/or the CBD for one or more of the M-TRPs in response to the value corresponding to the number of TRPs which are required to be evaluated by the transceiving apparatus.

22. The transceiving apparatus in accordance with either claim 20 or claim 21 wherein a list of M-TRPs, which are evaluated by the transceiving apparatus, is selected by a configured rule, such as list of M-TRPs with strongest RSRPs, indices in ascending/descending order, or up to implementation of the transceiving apparatus.

23. The transceiving apparatus in accordance with any of the preceding claims wherein the circuitry identifies the first one of the M-TRPs in response to signals received on a PDCCH in accordance with a radio resource control (RRC) configuration of the network.

24. The transceiving apparatus in accordance with any of the preceding claims wherein the transceiver simultaneously receives PDSCH from two or more of the M-TRPs, where the PDSCH received from each of the two or more of the M-TRPs are received in different layers.

25. The transceiving apparatus in accordance any of the preceding claims wherein the transceiver receives signals comprising a single DCI-based M-TRP transmission.

26. The transceiving apparatus in accordance any of claims 1 to 24 wherein the transceiver receives signals comprising a multiple DCI-based M-TRP transmission.

27. A system comprising:
a network comprising multiple transmission and reception points (M-TRPs) for transmitting and receiving signals; and
a transceiving apparatus comprising:
a transceiver, which in operation, receives signals from one or more of the M-TRPs; and
circuitry, which in operation, performs beam failure recovery (BFR) by evaluating beam failure detection (BFD) and candidate new beam detection(CBD) for the signals from a first one of the M-TRPs, wherein the network generates one or more values for performing BFD and CBD for one or more of M-TRPs and transmits the one or more values to the transceiving apparatus, and wherein the circuitry skips evaluation of one or both of the BFD and the CBD for one or more additional ones of the M-TRPs in response to one of the one or more values corresponding to the one or more additional ones of the M-TRPs.

28. The system in accordance with claim 27 wherein the one or more values corresponding to the one or more of M-TRPs can be indicated by using at least one of a downlink control information(DCI) message, a medium access control layer control element (MAC CE) message or a radio resource control (RRC) message.

29. The system in accordance with either claim 27 or claim 28 wherein the network generates the one or more values for performing BFD and CBD for the one or more of M-TRPs in response to network implementation.

30. The system apparatus in accordance any of claims 27 to 29 wherein the transceiver receives the signals from the one or more M-TRPs as single DCI-based M-TRP transmissions.

31. The system apparatus in accordance any of claims 27 to 29 wherein the transceiver receives the signals from the one or more M-TRPs as multiple DCI-based M-TRP transmissions.

32. The system in accordance with claim 31 wherein the one or more values comprise a duration of operating time for each individual TRP or information for each individual TRP received by the transceiver of the transceiving apparatus.

What is claimed is:
1. A transceiving apparatus comprising:
a transceiver, which, in operation, receives a first set of beam failure detection(BFD) reference signal configurations, a second set of BFD reference signal configurations, a first set of candidate new beam detection (CBD) reference signal configurations, and a second set of CBD reference signal configurations; and
circuitry, which, in operation, performs a first BFD relating to a first transmission and reception point (TRP) based on the first set of BFD reference signal configurations, a second BFD relating to a second TRP based on the second set of BFD reference signal configurations, and performs at least one of a first CBD relating to the first TRP based on the first set of CBD reference signal configurations or a second CBD relating to the second TRP based on the second set of CBD reference signal configurations.

2. The transceiving apparatus in accordance with claim 1, wherein the first set of BFD reference signal configurations, the second set of BFD reference signal configurations, the first set of CBD reference signal configurations, and the second set of CBD reference signal configurations are indicated by a Medium Access Control Control Element (MAC CE) or a Radio Resource Control (RRC) signaling.

3. The transceiving apparatus in accordance with claim 1, wherein the first and second BFD reference signal configurations and/or the first and second CBD reference signal configurations include a configuration of a channel state information(CSI) reference signal and/or a configuration of a synchronization signal block (SSB).

4. The transceiving apparatus in accordance with claim 1, wherein the transceiver, in operation, reports to a base station content including at least one result of the first BFD and at least one result of the second BFD.

5. The transceiving apparatus in accordance with claim 1, wherein whether both of the first BFD based on the first set of BFD reference signal configurations and the second BFD based on the second set of BFD reference signal configurations are performed is determined by a transmission configuration indication(TCI) state of downlink control information(DCI).

6. The transceiving apparatus in accordance with claim 1, wherein the transceiver, in operation, reports to a base station content including one result of the first BFD relating to the first set of BFD reference signal configurations or the second BFD relating to the second set of BFD reference signal configurations, and one result of the first CBD relating to the first set of CBD reference signal configurations or the second CBD relating to the second set of CBD reference signal configurations.

7. The transceiving apparatus in accordance with claim 1, wherein the transceiver, in operation, reports to a base station content including at least one result of the first BFD or the first CBD and at least one result of the second BFD or the second CBD.

8. A communication method performed by a communication apparatus comprising:
   receiving a first set of beam failure detection(BFD) reference signal configurations, a second set of BFD reference signal configurations, a first set of candidate new beam detection(CBD) reference signal configurations, and a second set of CBD reference signal configurations; and
   performing a first BFD relating to a first transmission and reception point (TRP) based on the first set of BFD reference signal configurations, a second BFD relating to a second TRP based on the second set of BFD reference signal configurations, and performing a first CBD relating to the first TRP based on the first set of CBD reference signal configurations or a second CBD relating to the second TRP based on the second set of CBD reference signal configurations.

9. The communication method in accordance with claim 8, wherein the first set of BFD reference signal configurations, the second set of BFD reference signal configurations, the first set of CBD reference signal configurations, and the second set of CBD reference signal configurations are indicated by a Medium Access Control Control Element (MAC CE) or a Radio Resource Control (RRC) signaling.

10. The communication method in accordance with claim 8, wherein the first and second BFD reference signal configurations and/or the first and second CBD reference signal configurations include a configuration of a channel state information(CSI) reference signal and/or a configuration of a synchronization signal block (SSB).

11. The communication method in accordance with claim 8, further comprising:
   transmitting content including at least one result of the first BFD and at least one result of the second BFD.

12. The communication method in accordance with claim 8, further comprising:
   determining, based on a transmission configuration indication(TCI) state of downlink control information (DCI), whether both of the first BFD based on the first set of BFD reference signal configurations and the second BFD based on the second set of BFD reference signal configurations are performed.

13. The communication method in accordance with claim 8, comprising:
   transmitting content including one result of the first BFD relating to the first set of BFD reference signal configurations or the second BFD relating to the second set of BFD reference signal configurations, and one result of the first CBD relating to the first set of CBD reference signal configurations or the second CBD relating to the second set of CBD reference signal configurations.

14. The communication method in accordance with claim 8, comprising:
   reporting, to a base station, content including at least one result of the first BFD or the first CBD and at least one result of the second BFD or the second CBD.

* * * * *